This invention relates to laminated structures comprising butyl rubber and nylon and also to an improved method of enhancing the adhesion between butyl rubber and fibrous filaments, cords, threads or fabrics made from nylon. More particularly, the present invention relates to coating nylon tire cords with a first layer of a carbon-black-free phenolic-aldehyde resin-containing brominated butyl rubber latex and a second layer of a phenolic-aldehyde resin-free carbon black-containing cement of brominated butyl rubber dissolved in an inert solvent, preferably a $C_5$ to $C_{10}$ saturated hydrocarbon such as hexane, benzene, naphtha or the like; the thus double coated cords being then imbedded and cured in a butyl rubber matrix resulting in improved adhesion thereto.

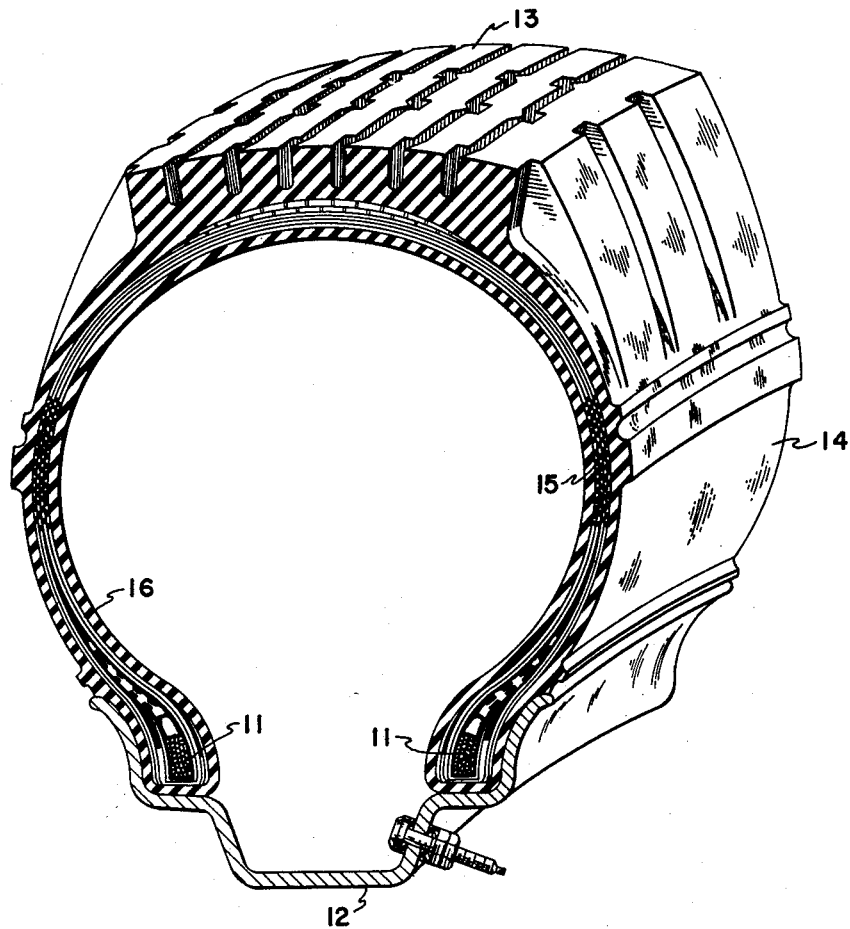
Alfred L. Miller
Francis P. Baldwin
Samuel B. Robison
INVENTORS
By H.Y. Pattison Jr.
Attorney 3,091,560
TIRE CORD ADHESION
Alfred L. Miller, Cranford, Francis P. Baldwin, Colonia, and Samuel B. Robison, Roselle, N.J., assignors to Esso Research and Engineering Company, a corporation of Delaware
Filed Mar. 26, 1959, Ser. No. 802,105
3 Claims. (Cl. 154—52)

This is a continuation-in-part of U.S. application Serial Number 668,015, filed on June 26, 1957, in the names of Francis P. Baldwin, Alfred L. Miller and Samuel B. Robison.

The invention will be best understood from the following description wherein reference will be made to the accompanying drawing in which the single FIGURE is a cross sectional view in perspective of a pneumatic tubeless tire employing therein brominated butyl rubber latex in accordance with the present invention.

Heretofore, nylon filaments, cords and threads have adhered very poorly to butyl rubber when they were united and the butyl rubber stock subsequently cured according to any known process for producing adhesion between butyl rubber and fibers. This poor adhesion has constituted a very serious obstacle to the more extensive use of butyl rubber in the manufacture of automobile tires, reinforced rubber belts for conveyors, power transmission, etc., and similar products consisting of alternate plies of rubber and cords. In these products the cord must adhere very strongly for long periods of time under drastic conditions of high temperature, constant flexing, bending and shock. For example, if nylon cord is pressed into butyl rubber or a butyl rubber stock and the composite is vulcanized, it will be observed that the nylon cord may be pulled away from the rubber with comparative facility.

It has been proposed to improve the adhesion of nylon fabric or cords to butyl rubber by coating the cords with rubber latex as an adhesive. However, this has only resulted in improving the adhesion between nylon and butyl rubber from about 9 or 11 pounds up to values of about 12 to 13 pounds.

In accordance with the present invention, the adhesion of nylon to butyl rubber is even further improved by coating the nylon filaments, cords or threads, prior to imbedding in a butyl rubber matrix and curing, with a first layer of a carbon-black-free phenolic-aldehyde resin-containing brominated butyl rubber latex and a second layer of a phenolic-aldehyde resin-free carbon black-containing cement of brominated butyl rubber dissolved in a $C_5$ to $C_8$ saturated aliphatic hydrocarbon such as hexane.

In practicing the present invention, nylon cords, threads or filaments are coated with a first layer of a carbon-black-free phenolic aldehyde resin containing brominated butyl rubber latex. The latex preferably contains about 0.5 to 20, and preferably about 1 to 15 parts by weight of brominated butyl rubber solids per 100 parts by weight of water together with about 0.5 to 50 parts by weight and preferably about 1.0 to 40 parts by weight of a phenolic aldehyde resin. This latex also preferably contains, per 100 parts by weight of brominated butyl rubber, about 0.05 to 20 and preferably about 0.5 to 10 parts by weight of an admixture of a major proportion of at least one emulsifier and a minor proportion of $NaH_2PO_4$. After drying for about 0.1 to 60 minutes, preferably for about 0.5 to 10 minutes at about 100° F. to about 400° F., preferably at about 150° F. to about 350° F., the nylon is coated with a second layer of a phenolic-aldehyde resin-free cement containing about 5 to 80, preferably about 30 to 60 parts by weight of at least one carbon black together with 100 parts by weight of brominated butyl rubber dissolved in a $C_6$ to $C_8$ saturated aliphatic hydrocarbon to form a 1 to 25%, advantageously a 5 to 20% and preferably a 10 to 18 weight percent solution. The nylon coated material is again dried as above and then imbedded in a butyl rubber containing matrix and cured for about 0.5 minute to 5 hours, preferably for about 5 to 100 minutes at about 250° to 400° F., preferably at about 275° to 375° F. to produce a finished article having improved adhesion between the nylon and butyl rubber matrix.

Butyl rubber comprises a copolymer containing about 85 to 99.5% preferably 95 to 99.5% of a $C_4$ to $C_8$ isoolefin such as isobutylene or 2-methyl-1-butene, the remainder being a $C_4$ to $C_{10}$ multiolefin, such as myrcene, dimethallyl or allo-ocimene or preferably a $C_4$ to $C_6$ conjugated diolefin such as butadiene, dimethyl butadiene, piperylene or especially isoprene. The preparation of butyl-type rubber is described in U.S. Patent 2,356,128 to Thomas et al. and also in other patents as well as in technical literature.

The brominated butyl rubber, to be used in accordance with the present invention, is produced by reacting unvulcanized butyl rubber with bromine or bromine-containing compounds so that the polymer contains at least about 0.5 weight percent of combined bromine but not more than about 3 atoms of bromine combined in the polymer per molecule of multiolefin present therein. The preferred brominated butyl rubber copolymers contain from about 0.8 weight percent combined bromine up to about 2 atoms of bromine per double bond in the copolymer.

Suitable brominating agents which may be employed are liquid bromine, alkali metal bromites, sulfur bromides (particularly oxygenated sulfur bromides), pyridinium bromide perbromide, N-bromosuccinimide, N-bromoacetamide, beta-bromomethyl phthalimide, N,N'-dibromo-5,5 dimethyl hydantoin and other common brominating agents. The brominaton is advantageously conducted at about −50° to +200° C. and preferably at about 20° to 65° C., depending on the particular brominating agent, for about one minute to several (e.g. 5) hours. However, the temperatures and times are regulated to brominate the rubbery copolymer to the extent about mentioned.

The bromination may be accomplished in various ways. One process comprises contacting the solid rubbery copolymer per se with the brominating agent or preparing a solution of the copolymer in a suitable inert liquid organic solvent such as an inert hydrocarbon or advantageously halogenated derivatives of saturated hydrocarbons, examples of which are hexane, heptane, naphtha, kerosene, straight run mineral spirits, benzene, toluene, chlorobenzene, chloroform, trichloroethane, carbon tetrachloride, etc., and adding thereto bromine or other brominating agent, either as such or in solution, such as dissolved in an alkyl chloride, carbon tetrachloride, etc., which is then added to the copolymer. The pressure is not critical and atmospheric pressure is satisfactory, although the pressure may vary from about 1 to 400 p.s.i. depending upon the foregoing temperatures and time of reaction.

The brominated butyl rubber latex is generally prepared by dissolving brominated butyl rubber in a hydrocarbon solution, preferably in an aliphatic hydrocarbon of 6 to 8 carbon atoms, e.g. hexane. The hydrocarbon solution may then be emulsified by an inversion technique in which water, containing an emulsifier, is added to a solution of brominated butyl rubber to form a water-in-oil emulsion which is then inverted to an oil-in-water emulsion by the further addition of water with mechanical or sonic agitation.

The particular emulsifiers employed are not critical and may be nonionic, anionic or cationic and are employed in amounts of between about 0.5 to slightly less than 20, advantageously about 1.0 to 10, and preferably about 2 to 8 weight percent based on brominated butyl rubber. Nonionic emulsifiers found to be useful for the purposes of the present invention comprise polyoxyalkenated alkyl phenols or alcohols having the formula $$R(OCHR_1CHR_1)_nOH$$

where R is an alkyl, aryl or alkaryl group, $R_1$ is an alkyl group or hydrogen and $n$ is an integer of 4 to 8 or 10, or even higher. The alkene oxide units should represent at least 40% of the total molecular weight of the compound. These latter compounds are prepared by condensing an alkyl phenol or an alcohol with ethylene oxide or propylene oxide. Commercial compounds which have been found useful in connection with the present invention include such materials as Triton X-100, Triton X-45 and Igepal CO-430 or the polypropylated glycols such as Pluronic F-68.

Anionic emulsifiers useful in certain combinations include sodium lauryl sulfate, the sodium salt of the sulfates of the polyoxyethylated alkyl phenols such as Alipal CO-433, sodium tridecylpolyethoxy ethyl sulfate and sodium oleyl taurate which is prepared by condensing abietic acid or tall oil acid with sodium methyl taurine, and known as Igepon TK-42.

Cationic emulsifiers useful in preparing a brominated butyl rubber latex include the alkyl dimethyl benzyl ammonium chlorides, diisobutyl phenoxyethoxyethyl dimethyl benzyl ammonium chloride, diisobutyl phenoxyethoxyethyl dimethyl benzyl ammonium chloride and dimethyl phenoxyethoxyethyl dimethyl ammonium chloride.

The $NaH_2PO_4$ may be substituted with amine or ammonium salts of dihydrogen orthophosphate. They are generally employed in concentrations between about 0.25 and 3.0 phr., and preferably between about 0.5 and 2.0 phr.

The initial amount of emulsifier used may vary, however it is desirable to have at least about 3 but less than 10 parts by weight based on polymer, in the final latex. For this reason, it is preferred that not more than 10 parts by weight be used. However, from 10 to 20 parts emulsifier based on polymer may be used, if desired. Adhesion to tire cord is improved by keeping the concentration below 15 parts, preferably below 10 parts.

After the preparation of the emulsion, the hydrocarbon solvent is removed by stripping. Foaming during this step may be reduced by diluting the latex with stripped or partially stripped latex during the stripping operation. If desired, however, the foam may be allowed to carry the solvent over in a gaseous state to a cooling surface where the solvent condenses and the foam breaks, leaving an aqueous layer under a liquid solvent layer. These layers may then be separated.

The phenolic-aldehyde resins which are within the purview of the present invention may be generally defined as belonging to the class of heat-hardening phenol-aldehyde type resins, preferably resins from phenolic compounds which, prior to heat-hardening or thermosetting are water soluble at least to the extent of about 5 to 10% or more. Such resins are capable of thermally setting in the absence of any added catalysts at temperatures of about 150° to 450° F., temperatures of about 200° to 400° F. being preferred.

As phenolic compounds capable of producing resins of the above-mentioned characteristics, mono or especially dihydroxy benzenes are satisfactory. Dihydroxy benzenes having the hydroxyl groups meta with respect to each other are preferred. Satisfactory phenolic compounds include phenol, cresols, phloroglucinol, xylenols, trimethyl phenols, mono or dichloro phenols, diamyl or diisopropyl phenols, p-tertiary butyl phenol, p-phenylphenol, hydroquinone, and especially resorcinol and its derivatives, such as orcinol.

The preferred aldehydes for reaction with the above phenolic compounds are formaldehyde or materials supplying formaldehyde such as paraformaldehyde. Other suitable aldehydes include acetaldehyde, furfural, etc. The ratio of the phenolic compound to the aldehyde is preferably such that the resin, prior to thermosetting, has substantial water solubility. In order to produce the desired resin, a small amount of an alkali metal containing catalyst or other condensing agent is preferred. If sodium hydroxide is employed, it is advantageously present in amounts of between about 0.02 and 0.5 percent by weight, based on reactants.

Since the presence of alkalies such as sodium and potassium hydroxide catalyze the polymerization or condensation of the phenol and the aldehyde to form the resin, these may be present in the dispersion together with the synthetic latex, the phenolic material and the aldehyde. A solution of resorcinol, formaldehyde and caustic may be aged for about 2 to 10 hours prior to admixing with the latex at room temperature or slightly elevated temperatures, e.g. 75° C., or as hereinafter described, the aging may take place after mixing with the latex.

The brominated butyl rubber latex is generally mixed with a phenol-formaldehyde solution, such as for example an aqueous solution containing resorcinol and formaldehyde, and the pH of the mixture is adjusted, i.e., by titration with an alkali such as sodium hydroxide to between about 7.0 and 9.5, preferably to between about 7.5 and 9.0 and the mixture is allowed to stand until condensation of the phenol and formaldehyde occurs, preferably overnight. A tire cord is dipped in the dispersion and the treated cord is then thoroughly dried in hot air, preferably at a temperature above about 150° F. or even more especially above 200° F. The cords are then ready to be coated with a second layer comprising a phenolic-aldehyde resin-free brominated butyl rubber cement in a $C_5$ to $C_8$ aliphatic hydrocarbon and containing about 5 to 80 weight percent based on brominated butyl rubber of at least one carbon black.

Typical carbon blacks for use in the brominated butyl rubber cement layer containing brominated butyl rubber dissolved in a $C_5$ to $C_8$ aliphatic hydrocarbon comprise such channel blacks as M.P.C. or E.P.C. blacks; such furnace blacks as S.R.F., S.A.F., I.S.A.F., G.P.F., H.A.F., or F.E.F. blacks; or such thermal blacks as F.T. or M.T. blacks, etc. The channel blacks are preferred.

In order to more fully illustrate the present invention, the following experimental data are given:

EXAMPLE

Nylon tire cords were immersed in various brominated butyl rubber latices which were free of carbon black and contained 100 parts by weight of water, 0.98 to 2.90 weight percent based on water of various resorcinol-formaldehyde resins, 1 to 15 weight percent based on water of brominated isobutylene-isoprene butyl rubber latex solids having a mole percent unsaturation of 1.6, a viscosity average molecular weight of 380,000, a Mooney viscosity at 212° F. for 8 minutes of 53 and containing 2.17 weight percent of combined bromine based on brominated butyl rubber, 5 weight percent based on brominated butyl rubber solids of sodium nonylphenoxy-ethoxyethyl sulfate, and 1 weight percent based on brominated butyl rubber solids of $NaH_2PO_4$. The pH of this mixture was adjusted to 8.3 prior to aging and was then aged at 70° F. overnight prior to cord treatment.

The thus coated nylon tire cords were then dried at 250° F. for 5 minutes and dipped into a phenolic-aldehyde resin-free cement of a 15% solution in hexane of 100 parts by weight of the same type of brominated butyl rubber and 50 parts by weight of M.P.C. carbon black.

The nylon cords were again dried, this time for 2 minutes at 250° F. and then imbedded in a butyl rubber matrix containing 100 parts by weight of an isobutylene-isoprene butyl rubber copolymer having a Mooney viscosity at 212° F. for 8 minutes of 43, a mole percent unsaturation of 2.3 and a viscosity average molecular weight of 340,000. The butyl rubber in the matrix was compounded into the following formulation in all instances.

| Component: | Parts by weight |
|---|---|
| Butyl rubber | 100 |
| M.P.C. black | 24 |
| S.R.F. black | 16 |
| N,4-dinitroso-N-methyl aniline | 1.0 |
| Zinc oxide | 5.0 |
| Sulfur | 2.0 |
| Tellurium diethyl dithiocarbamate | 1.25 |
| 2,6-dimethylol-4-octyl phenol resin | 2.5 |
| Hydrocarbon plasticizer oil [1] | 12.5 |

[1] The hydrocarbon plasticizer oil was derived from a naphthenic crude and had a specific gravity of 0.90, a flash point by the open cup method of 445° F., a viscosity at 100° F. in S.S.U. of 510 and at 210° F. in S.S.U. of 55, and an iodine number of 16 cg./g.

The data may be summarized as follows wherein the "H" test adhesion values in lbs./end at room temperature at a pull of 10 inches per minute are as described in "Rubber Chemistry and Technology" by W. J. Lyons et al., volume 20, page 268 (1957). The test specimens measured 1½″ x ⅜″ x ⅛″. The results were as follows:

Table

| Run | 1 | 2 | 3 | 4 | 5 |
|---|---|---|---|---|---|
| Brominated Butyl Solids, Percent | 1 | 2 | 4 | 6 | 15 |
| Resorcinol, Percent | 0.38 | 0.38 | 0.38 | 1.10 | 1.10 |
| Formaldehyde (37%), Percent | 0.60 | 0.60 | 0.60 | 1.80 | 1.80 |
| "H" Test Adhesion (lbs./end) | 18.8 | 18.0 | 20.5 | 19.7 | 16.9 |

The above data show that nylon tire cords have an adhesion to butyl rubber of between 16.9 and 20.5 pounds when the nylon cords have been coated with a first layer of a carbon-black free phenolic-aldehyde resin-containing brominated butyl rubber latex and then with a phenolic-aldehyde resin free solution of dissolved brominated butyl rubber containing added carbon black. Tests under the same conditions, omitting the coating of dissolved brominated butyl rubber plus carbon black, and using only the latex coating resulted in lower adhesions of nylon to butyl rubber of only 11.8 to 12.7 pounds.

One particularly advantageous use for the nylon tire cords coated with a first layer of brominated butyl rubber plus phenolic aldehyde resins and a second layer of a carbon black-containing brominated butyl rubber cement, of the present invention, is in pneumatic tires of either the inner tube containing variety or in a tubeless type tire.

Referring now to the drawing, the single figure depicts a pneumatic tubeless tire which comprises a hollow toroidal type member which is substantially U-shaped in cross-section by virtue of an open portion which extends around the inner periphery of the member. In other words, the tire is of a tubular type structure which has a cross-section in the form of an open-bellied body with spaced terminal portions to define a member generally resembling a horseshoe. The terminal portions constitute the bead portions 11—11 of the tire inside of which are a plurality of bead wires adhesively imbedded and molded in a rubber. The outer surface of the bead portion is advantageously formed into an air sealing means, such as a plurality of ribs to aid in adhesion to rim 12 when the tire is inflated.

The outer surface of the tire also includes tread area 13 and sidewalls 14. The open portion of the horseshoe-shaped tire faces that portion of the inner circumference of the tire which is adjacent the said tread area 13 of the tire. The remaining construction of the tire may vary according to conventional fabrication, but in general the tire is a multi-layered type of structure with an outer layer as above mentioned. The layer next adjacent the outer layer generally comprises a carcass 15 which includes a rubber having incorporated therein a fabric composed of a plurality of nylon cords. These tire cords are, in accordance with the present invention, coated with a first layer of an aqueous latex containing brominated butyl rubber and a resinous phenolic-aldehyde condensation product and a second layer comprising a brominated butyl rubber cement plus carbon black. The brominated butyl rubber used contains at least 0.5 weight percent combined bromine but not more than 2 combined atoms of bromine per double bond in the polymer. The resulting double coated cord, when dried, has been found to have very good adhesion after vulcanization at about 250 to about 400° F., to butyl rubber in the carcass layer of the tire.

The tire also includes an inner lining advantageously made from rubber, e.g. natural rubber, butyl rubber or brominated butyl rubber, which must be substantially impermeable to air. For example, the lining may advantageously comprise natural rubber, a rubbery copolymer, a brominated copolymer, or mixtures of any of the above wherein the copolymer comprises the reaction product of about 85 to 99.5 weight percent of a $C_4$ to $C_8$ isoolefin, such as isobutylene, and about 0.5 to 15 weight percent of a $C_4$ to $C_{10}$ multiolefin, such as isoprene, which has been at least partially vulcanized by heating in the presence of a vulcanization agent for from several minutes to 5 hours at 200° to 400° F. The above multi-layers, at least 2 in number, are conventionally bonded or otherwise adhere together, for example, by cementing and/or especially by vulcanization, etc., to form a tire of a unitary structure.

An intermediate or carcass layer including butyl rubber and a plurality of nylon fibrous cords and/or fabric, must be of both desirable rigidity and strength. The performance of this layer is therefore dependent upon the bond or adhesion between the cords or fabric and the butyl rubber. Butyl rubber does not normally have good adhesion to such fibrous materials, particularly if they are nylon. The present invention has solved this difficulty by providing a strong bond between butyl rubber and such nylon fibers. This is accomplished by employing the double coating technique of the present invention as hereinbefore described.

Resort may be had to modifications and variations of the disclosed embodiments without departing from the spirit of the invention or the scope of the appended claims.

What is claimed is:

1. A process for treating nylon-containing fibrous material which comprises coating said material with a first layer of a carbon black-free latex comprising 0.5 to 20 parts by weight of a brominated isoolefin-multiolefin copolymer and about 0.5 to 50 parts by weight of a phenolic-aldehyde resin in 100 parts by weight water, said brominated copolymer comprising 85 to 99.5 weight percent $C_4$ to $C_8$ isoolefin and 15 to 0.5 weight percent $C_4$ to $C_{10}$ multiolefin and containing at least about 0.5 weight percent bromine but not more than about 3 atoms combined bromine per double bond in the copolymer, drying said coated material, coating the dried material with a second layer of a cement consisting of about 1 to 25 weight percent of said brominated copolymer and about 5 to 80 parts by weight of carbon black per 100 parts brominated copolymer in $C_5$ to $C_8$ hydrocarbon solvent, and redrying said material to produce a coated material having improved adhesion to isoolefin-multiolefin rubbery copolymers.

2. The process of claim 1 wherein the phenolic aldehyde resin is a resorcinol-formaldehyde condensation product.

3. The product of claim 1.

References Cited in the file of this patent

UNITED STATES PATENTS

| | | |
|---|---|---|
| 2,331,323 | Jahant | Oct. 12, 1943 |
| 2,354,426 | Briant | July 25, 1944 |
| 2,458,222 | Talalay | Jan. 4, 1949 |
| 2,575,249 | Connell | Nov. 13, 1951 |
| 2,631,984 | Crawford | Mar. 17, 1953 |
| 2,691,614 | Wilson | Oct. 12, 1954 |
| 2,720,479 | Crawford | Oct. 11, 1955 |
| 2,822,311 | Rowe | Feb. 4, 1958 |
| 2,968,588 | Baldwin | Jan. 17, 1961 |